United States Patent
Kummer (10) Patent No.: US 9,693,099 B2
(45) Date of Patent: *Jun. 27, 2017

(54) APPARATUS AND METHODS FOR RESOLVING RECORDING CONFLICTS OF A DIGITAL VIDEO RECORDER

(71) Applicant: ECHOSTAR TECHNOLOGIES L.L.C., Englewood, CO (US)

(72) Inventor: David A. Kummer, Highlands Ranch, CA (US)

(73) Assignee: EchoStar Technologies L.L.C., Englewood, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 14/728,506

(22) Filed: Jun. 2, 2015

(65) Prior Publication Data
US 2015/0271552 A1 Sep. 24, 2015

Related U.S. Application Data

(63) Continuation of application No. 13/572,400, filed on Aug. 10, 2012, now Pat. No. 9,077,948, which is a
(Continued)

(51) Int. Cl.
*H04N 5/76* (2006.01)
*H04N 21/458* (2011.01)
(Continued)

(52) U.S. Cl.
CPC ........... *H04N 21/4583* (2013.01); *H04N 5/76* (2013.01); *H04N 21/4227* (2013.01);
(Continued)

(58) Field of Classification Search
CPC ........... H04N 21/4334; H04N 21/4583; H04N 21/47214; H04N 21/6181; H04N 5/76
(Continued)

(56) References Cited

U.S. PATENT DOCUMENTS 4,449,198 A 5/1984 Kroon et al.
4,508,935 A 4/1985 Mastromoro
(Continued)

FOREIGN PATENT DOCUMENTS

EP 0836320 A2 4/1998
JP 08227544 9/1996
(Continued)

OTHER PUBLICATIONS

International Search Report and Written Opinion for International application No. PCT/US2009/069164, issued by the European Patent Office on Mar. 23, 2010, 17 pages.
(Continued)

*Primary Examiner* — Robert Chevalier
(74) *Attorney, Agent, or Firm* — LK Global (57) ABSTRACT

Apparatus and methods are provided which facilitate the resolution of recording conflicts of a digital video recorder (DVR). A DVR identifies a recording conflict between a first recording timer associated with a first television program and a second recording timer associated with a second television program. A communication is initiated to a communication device associated with a user of the digital video recorder to inform the user of the recording conflict. Responsive to the communication, the user provides information to the DVR via the communication device requesting to resolve the recording conflict. The DVR utilizes the provided information to modify one or more of the conflicted recording timers to resolve the conflict.

20 Claims, 6 Drawing Sheets

Related U.S. Application Data continuation of application No. 12/360,643, filed on Jan. 27, 2009, now Pat. No. 8,244,106.

(60) Provisional application No. 61/140,781, filed on Dec. 24, 2008.

(51) Int. Cl.

| | |
|---|---|
| *H04N 21/4227* | (2011.01) |
| *H04N 21/433* | (2011.01) |
| *H04N 21/4402* | (2011.01) |
| *H04N 21/472* | (2011.01) |
| *H04N 21/488* | (2011.01) |
| *H04N 21/61* | (2011.01) |

(52) U.S. Cl.
CPC . *H04N 21/4334* (2013.01); *H04N 21/440236* (2013.01); *H04N 21/47214* (2013.01); *H04N 21/4882* (2013.01); *H04N 21/6181* (2013.01); *H04N 21/6187* (2013.01)

(58) Field of Classification Search
USPC .................. 386/292, 291, 293, 295, 299
See application file for complete search history.

(56) References Cited

U.S. PATENT DOCUMENTS

| | | |
|---|---|---|
| 4,540,851 A | 9/1985 | Hashimoto |
| 4,625,080 A | 11/1986 | Scott |
| 4,829,555 A | 5/1989 | Hashimoto |
| 4,841,562 A | 6/1989 | Lem |
| 4,882,747 A | 11/1989 | Williams |
| 4,885,766 A | 12/1989 | Yasuoka et al. |
| 4,899,370 A | 2/1990 | Kameo et al. |
| 4,908,713 A | 3/1990 | Levine |
| 4,918,439 A | 4/1990 | Wozniak et al. |
| RE33,369 E | 10/1990 | Hashimoto |
| 5,216,228 A | 6/1993 | Hashimoto |
| 5,228,077 A | 7/1993 | Darbee |
| 5,410,326 A | 4/1995 | Goldstein |
| 5,414,761 A | 5/1995 | Darbee |
| 5,420,913 A | 5/1995 | Hashimoto |
| 5,450,135 A | 9/1995 | Schick |
| 5,532,832 A | 7/1996 | Hailey et al. |
| 5,557,421 A | 9/1996 | Kurtia |
| 5,570,415 A | 10/1996 | Stretton et al. |
| 5,600,711 A | 2/1997 | Yuen |
| 5,631,745 A | 5/1997 | Wong et al. |
| 5,646,603 A | 7/1997 | Nagata et al. |
| 5,657,414 A | 8/1997 | Lett et al. |
| 5,671,267 A | 9/1997 | August et al. |
| 5,677,895 A | 10/1997 | Mankovitz |
| 5,706,334 A | 1/1998 | Balk et al. |
| 5,710,605 A | 1/1998 | Nelson |
| 5,748,716 A | 5/1998 | Levine |
| 5,805,763 A | 9/1998 | Lawler et al. |
| 5,852,705 A | 12/1998 | Hanko et al. |
| 5,901,366 A | 5/1999 | Nakano et al. |
| 6,208,799 B1 | 3/2001 | Marsh et al. |
| 6,614,987 B1 | 9/2003 | Ismail et al. |
| 6,772,433 B1 | 8/2004 | LaJoie et al. |
| 7,096,486 B1 | 8/2006 | Ukai et al. |
| 7,107,608 B2 | 9/2006 | Wagner |
| 2003/0126607 A1 | 7/2003 | Phillips et al. |
| 2004/0073947 A1 | 4/2004 | Gupta |
| 2005/0097607 A1 | 5/2005 | Kummer et al. |
| 2006/0115058 A1 | 6/2006 | Alexander et al. |
| 2006/0195867 A1 | 8/2006 | Takehara et al. |
| 2006/0212906 A1 | 9/2006 | Cantalini |
| 2006/0268099 A1* | 11/2006 | Potrebic ............. H04N 5/782 348/14.01 |
| 2007/0079345 A1 | 4/2007 | McEnroe |
| 2009/0241151 A1 | 9/2009 | Frank |

FOREIGN PATENT DOCUMENTS

| | | |
|---|---|---|
| TW | 200633522 A | 9/2006 |
| TW | 200743380 A | 11/2007 |
| WO | 2007057187 A1 | 5/2007 |

OTHER PUBLICATIONS

"TIVO Launches Remote Scheduling with Verizon Wireless", cited on the Verizon Wireless internet page located at http://news.vzw.com/news/2007/03/pr2007-03-14.html dated Mar. 14, 2007, 2 pages.

"AT&T Lets Mobile Phones Control Your Television", Associated Press article dated Mar. 6, 2001, 3 pages.

USPTO "Non-Final Office Action" mailed Dec. 7, 2011 for U.S. Appl. No. 12/360,643, filed Jan. 27, 2009.

USPTO "Notice of Allowance" mailed Apr. 20, 2012 for U.S. Appl. No. 12/360,643, filed Jan. 27, 2009.

Intellectual Property Office "Office Action" dated Dec. 22, 2012 for Taiwan Patent Appln. No. 098144500.

* cited by examiner

APPARATUS AND METHODS FOR RESOLVING RECORDING CONFLICTS OF A DIGITAL VIDEO RECORDER

RELATED APPLICATIONS

This application claims the benefit of U.S. Non-Provisional application Ser. No. 13/572,400 entitled "APPARATUS AND METHODS FOR RESOLVING RECORDING CONFLICTS OF A DIGITAL VIDEO RECORDER", filed Aug. 10, 2012; which claims the benefit of U.S. Non-Provisional application Ser. No. 12/360,643 entitled "APPARATUS AND METHODS FOR RESOLVING RECORDING CONFLICTS OF A DIGITAL VIDEO RECORDER", filed Jan. 27, 2009; which claims the benefit of U.S. Provisional Application No. 61/140,781, entitled "APPARATUS AND METHODS FOR RESOLVING RECORDING CONFLICTS OF A DIGITAL VIDEO RECORDER", filed Dec. 24, 2008.

BACKGROUND

Digital video recorders (DVRs) allow users to record television programs for later viewing. Typically, users set recording timers to record particular television programs at specified times. Recording conflicts occur if two or more recording timers are set at the same time or otherwise overlap. Recording conflicts may occur after the user sets a recording timer if the broadcast schedule changes for selected programs. A DVR may automatically resolve a recording conflict according to pre-determined priority rules absent user input to the contrary. The priority rules may result in the DVR not recording a program that the user would have preferred to record. Thus, it is a problem that the user is not able to resolve recording conflicts while away from their DVR.

BRIEF DESCRIPTION OF THE DRAWINGS

The same number represents the same element or same type of element in all drawings.

DETAILED DESCRIPTION

The various embodiments described herein generally provide apparatus, systems and methods which facilitate the resolution of recording conflicts. A DVR identifies a recording conflict between a first recording timer associated with a first television program and a second recording timer associated with a second television program. A communication is initiated to a communication device associated with a user of the digital video recorder to inform the user of the recording conflict. Responsive to the communication, the user provides information to the DVR via the communication device requesting to resolve the recording conflict. The DVR utilizes the provided information to modify one or more of the conflicted recording timers to resolve the conflict. In short, the various embodiments described herein generally provide apparatus, systems and methods for exchanging information with a communication device to resolve recording conflicts of a DVR.

In at least one embodiment, the DVR initiates transmission of one or more short-message-service (SMS) messages to a communication device associated with a user of the DVR. The SMS message includes information regarding the recording conflict, such as identification of the television programs associated with the conflicted recording timers. In at least one embodiment, the SMS message includes options for resolving the recording conflict. A user may reply to the SMS message with a request to resolve the recording conflict, e.g., by choosing one of the options presented in the SMS message. The DVR receives the reply to the SMS message, processes the contents of the message and modifies one or more recording timers accordingly to resolve the recording conflict as indicated by the user's instructions.

In at least one embodiment, the DVR may initiate transmission of an e-mail to a communication device associated with a user of the DVR. The user receives the e-mail message notification regarding the recording conflict and provides input, via a reply e-mail, requesting to resolve the recording conflict. The DVR processes the input to modify one or more recording timers to resolve the recording conflict according to the user's instructions.

In at least one embodiment, the DVR is operable to identify a recording conflict and options for resolving the recording conflict. The DVR is further operable to initiate a phone call to the communication device of the user and provide the options to the user during the phone call. For example, the DVR may include a text-to-speech converter to synthesize the information regarding the recording conflict into speech for presentation to the user. The user may responsively provide input during the phone call requesting to resolve the recording conflict, e.g., by pressing a button on a telephone to select one of the presented options. In at least one embodiment, the DVR, or a communicatively coupled server, may include speech recognition capability for collecting input from the user. The DVR then processes the provided input to modify the recording timers accordingly.

In various embodiments, a DVR may utilize one or more of the aforementioned communication techniques to solicit information from a user for resolving a recording conflict. For example, a DVR may notify a user via an SMS message regarding a recording conflict and may receive input from the user via an e-mail message requesting to resolve the recording conflict. In at least one embodiment, the DVR may provide notification regarding the recording conflict to the user during a phone call, and the user may provide input to the DVR via other communication mediums, such as an SMS or e-mail message. Further, the techniques described herein may be applied to systems that include either stand-alone DVRs (e.g., recording devices located at customer premises) as well as network DVRs (e.g., recording devices located distal from the customer premises).

Figure 1:
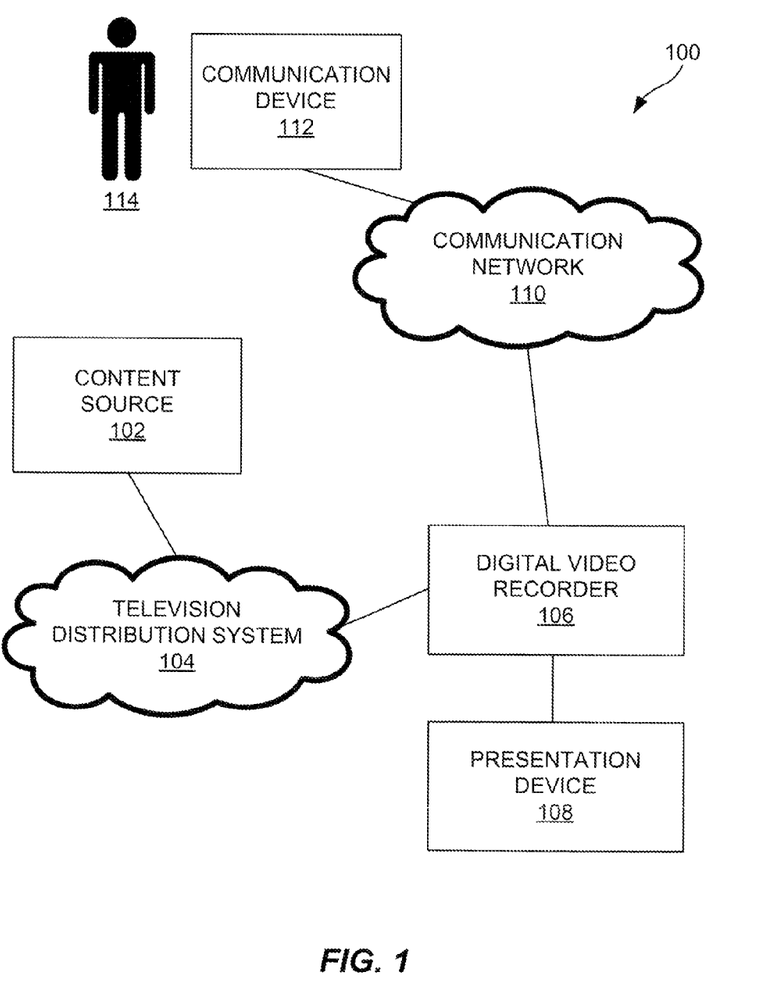
FIG. 1 illustrates an embodiment of a communication network.

FIG. 1 illustrates an embodiment of a communication network 100. The communication network includes a content source 102, a television distribution system 104, a DVR 106, a presentation device 108, a communication network 110 and a communication device 112. Each of these components will be discussed in greater detail below. The communication network 100 may include other components, elements or devices not illustrated for the sake of brevity.

The content source 102 is operable for receiving, generating and communicating content to one or more DVRs 106.

The content to be received, processed, outputted and/or communicated may come in any of various forms including, but not limited to, audio, video, data, information, or otherwise. In at least one embodiment, the content source 102 is operable for receiving various forms and types of content from other sources, aggregating the content and transmitting the content to the DVR 106 through the television distribution system 104. It is to be appreciated that the content source 102 may receive practically any form and/or type of information from one or more sources including streaming television programming, recorded audio or video, electronic programming guide data and the like.

The television distribution system 104 is operable to transmit content from the content source 102 to the DVR 106. The television distribution system 104 may comprise any type of wired (e.g., cable and fiber) and/or wireless (e.g., cellular, satellite, microwave, and other types of radio frequency) communication medium and any desired network topology (or topologies when multiple mediums are utilized). Exemplary television distribution systems 104 include terrestrial, cable, satellite and internet protocol television (IPTV) distribution systems. In at least one embodiment, the television distribution system 104 broadcasts or multicasts content to a plurality of television receivers, e.g., DVR 106. The television distribution system 104 may also distribute content to a specific addressable television receiver, e.g., DVR 106, such as video-on-demand and the like. In at least one embodiment, the content source 102 may be embodied as a transmission facility of the television distribution system 104. Exemplary content sources 102 include over-the-air transmission facilities, cable television distribution head-ends, satellite television uplink centers, broadband or internet servers and the like.

The DVR 106 is operable to receive content from the television distribution system 104 and store the received content for subsequent presentation to the user 114. The DVR 106 is further operable to output the received and/or stored content for presentation by the presentation device 108. In at least one embodiment, the presentation device 108 is a display device (e.g., a television) configured to display content to a user. The DVR 106 may receive an audio/video stream in any format (e.g., analog or digital format), and store and output the audio/video stream for presentation by the presentation device 108. In at least one embodiment, the DVR 106 may be integrated with a television receiver, such as a satellite, cable, over-the-air, broadband or other type of television receiver that receives and demodulates television signals that are outputted for display on a display device (e.g., a television). As used herein, a television receiver or DVR may also be referred to as a set-top box, which is a television receiver that is located externally with respect to a display device. The DVR 106 may be further configured to output menus and other information that allow a user to control the output of audio/video content by the DVR 106, viewing electronic programming guides (EPGs), set recording timers and the like. In some embodiments, the DVR 106 and the presentation device 108 may be integrated as a device combining the functionality of a display device and television receiver/DVR or the like.

Responsive to particular recording timers, the DVR 106 coordinates the reception of video signals associated with a television program through a television receiving resource (e.g., a television tuner) and storage of the video signal onto a storage medium (e.g., a hard drive). The DVR 106 may include any number of television receiving resources utilized for receiving television programs. A DVR 106 minimally includes at least one television receiving resource to receive and record video signals associated with a television program. The DVR 106 may include multiple television receiving resources to record multiple television programs simultaneously. In at least one embodiment, the DVR 106 may include multiple types of television receiving resources, such as an over-the-air (ATA) tuner and a satellite and/or cable television tuner. In some embodiments, the DVR 106 may be operable to assign a recording timer associated with a particular program to a specified television receiving resource. For example, a first television program, broadcast between 7:00 P.M. and 8:00 P.M., may be assigned to a first satellite television tuner of the DVR 106, and a second television program, broadcast between 7:00 P.M. and 9:00 P.M., may be assigned to a second satellite television tuner of the DVR 106.

Priorities may also be assigned to particular recording timers to provide the DVR 106 with information for resolving recording conflicts. Thus, if a recording conflict occurs between two or more recording timers, then the DVR 106 may apply rules to the priority information to determine which program to record absent input by the user 114 requesting to resolve the conflict. For example, the earliest set recording timer may have the highest priority for recording. Similarly, a more recently set recording timer may have the highest priority for recording. In some embodiments, a user 114 may provide a recording priority for a particular timer when selecting the timer for recording. Thus, the particular rules applied by the DVR 106 for resolving recording conflicts may be determined based on desired design criteria.

The DVR 106 is further operable to exchange information with the communication device 112 through the communication network 110. The communication network 110 may include any type of network that provides any type of connectivity between the DVR 106 and the communication device 110. The communication network 110 may utilize any desired combination of wired (e.g., cable and fiber) and/or wireless (e.g., cellular, wireless, satellite, microwave, and radio frequency) communication mediums and any desired network topology (or topologies when multiple mediums are utilized). Exemplary communication networks include television distribution networks (e.g., satellite and cable television networks), wireless communication networks, public switched telephone networks (PSTN), the internet and local area networks (LAN) or wide area networks (WAN) providing data communication services.

The communication device 112 may comprise any type of device capable of connecting with the communication network 110 to receive information from the DVR 106. Exemplary communication devices 112 include telephones, mobile telephones, computers, personal digital assistants (PDAs), pagers and the like. The DVR 106 and the communication device 112 may communicate over any type of communication service or protocol. For example, the DVR 106 and the communication device 112 may exchange text data or the like via SMS or e-mail messages. In at least one embodiment, the communication device 112 and the DVR 106 may exchange information over a phone call, such as voice data or dual-tone-multi-frequency (DTMF) signals. In some embodiments, the DVR 106 and the communication device 112 may exchange information over any combination of the aforementioned communication services.

The DVR 106 is operable to identify recording conflicts between two or more recording timers associated with two or more television programs. Responsive to identifying a recording conflict, the DVR 106 is operable to initiate a communication with the communication device 112. The DVR 106 transmits information regarding the recording conflict to the communication device 112, e.g., the television programs or recording timers involved in the conflict, options for resolving the recording conflict and the like. In at least one embodiment, the explanation identifies the default resolution of the recording timer to be utilized by the DVR 106 absent any user input. The user 114 receives the notification regarding the recording conflict via the communication device 112 and determines an appropriate solution for resolving the recording conflict. For example, the user 114 may cancel one of the recording timers, adjust the time or duration of one or more of the recording timers or associate one of the timers with a different broadcast of the same program. The user 114 provides input to the communication device 112 requesting to resolve the recording conflict, and the communication device 112 transmits the input to the DVR 106 for further processing. The DVR 106 processes the input and modifies one or more of the conflicted recording timers in accordance with the user's 114 instructions. Responsive to the modified recording timers, the DVR 106 operates to record the selected television programs for subsequent viewing by the user 114.

Figure 2:
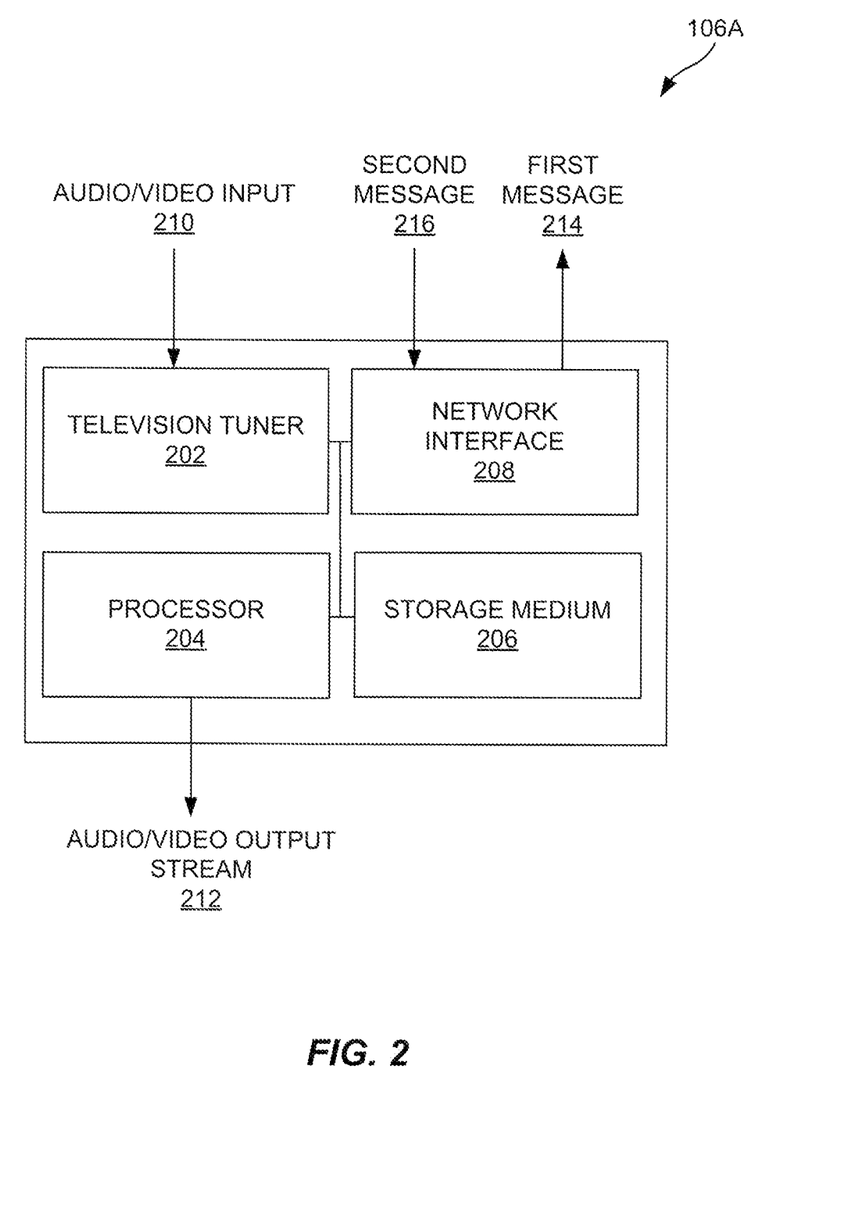
FIG. 2 illustrates an embodiment of a DVR of FIG. 1.

FIG. 2 illustrates an embodiment of a DVR of FIG. 1. FIG. 2 will be discussed in reference to the communication network 100 illustrated in FIG. 1. The DVR 106A includes a television tuner 202, a processor 204, a storage medium 206 and a network interface 208. Each of these components will be discussed in greater detail below. The DVR 106A may include other elements, components or devices which are not illustrated for the sake of brevity.

The television tuner 202 is operable to receive an audio/video input 210 from the content source 102 (see FIG. 1). More particularly, the television tuner 202 receives and tunes a television signal including television programming. The television tuner 202 may receive an over-the-air broadcast, a direct broadcast satellite signal, a cable television signal or an internet protocol television (IPTV) signal and tune the audio/video input 210 to extract the selected television programming. In at least one embodiment, the DVR 106A may include multiple tuners 202 utilized to view and/or record multiple television programs simultaneously.

The storage medium 206 is operable to persistently store video signals recorded by the DVR 106A. The storage medium 206 may comprise any type of non-volatile memory appropriate for storing video signals recorded by the DVR 106A. Exemplary storage mediums 206 include hard drives (e.g., magnetic memory), flash memory, battery packed up memory and the like. In at least one embodiment, the storage medium 206 may be internally located within the DVR 106A. In other embodiments, the storage medium 206 may be located external with respect to the DVR 106A. The DVR 106A may also utilize a combination of internal and external storage mediums 206 for storage of video signals.

The processor 204 is operable to control the operation of the DVR 106A. The processor 204 may be a single processing device or a plurality of processing devices that cooperatively operate to control the operation of the DVR 106A. The processor 204 may include various components or modules for processing and outputting audio/video content. Exemplary components or modules for processing audio/video content include a demodulator, a decoder, a decompressor, a conditional access module and a transcoder module.

The processor 204 coordinates storage of the audio/video input 210 onto the storage medium 206. The processor 204 may also be operable to generate an audio/video output stream 212 based on the audio/video input 210, e.g., pass through the signal for display by an associated presentation device 108. The processor 204 is also operable to retrieve stored video content to generate an audio/video output stream 212 for display by the presentation device 108. An audio/video output stream 212 is outputted to the presentation device 108 (see FIG. 1) for presentation to the user 114. The processor 204 may incorporate circuitry to output the audio/video output streams 212 in any format recognizable by the presentation device 108 using any type of interface, such as composite video, component video, Digital Visual Interface (DVI) and High-Definition Multimedia Interface (HDMI), internet, 1394 and WiFi. The processor 204 may also incorporate circuitry to support multiple types of these or other audio/video formats. In at least one embodiment, as described above, the DVR 106A may be integrated with the presentation device 108, and the processor 204 may be operable to control the presentation of the audio/video output stream 212.

To coordinate the storage of the audio/video input 210, the processor 204 is operable to receive user input requesting to record one or more television programs. The processor 204 responsively sets recording timers associated with the television programs. The processor 204 is further operable to output user interface menus and other information to allow the user 114 to view the recording timers, modify recording timers, identify recording conflicts and provide input for resolving the recording conflicts in a desired manner.

The network interface 208 is operable to communicate with the communication device 112 through the communication network 110. More particularly, the network interface 208 exchanges data with the communication device 112 regarding a recording conflict. The network interface 208 may communicatively couple to the communication network 110 using any type of wired or wireless communication link and using any type of network topology and protocol. For example, the network interface 208 may comprise an Ethernet port that communicatively couples to the base station over the internet. In at least one embodiment, the network interface 208 may be assigned a communication identifier for communicating with the communication network 110 and other devices, such as the communication device 112. For example, the network interface 208 may be assigned an e-mail address, phone number or the like for sending and receiving communications.

In at least one embodiment, the communication network 110 comprises the internet, and the network interface 208 is configured to transmit data to the communication device 112 over the internet. For example, the processor 204 may identify a recording conflict, and the network interface 208 may transmit an e-mail message addressed to the communication device 112 regarding the recording conflict. The message may be addressed to an e-mail address associated with the communication device 112. In at least one embodiment, the network interface 208 is configured to transmit other types of messages, such as an SMS message, to the communication network 110 for transmission to the communication device. The network interface 208 may be configured to address the SMS message to a phone number, e-mail address or other communication identifier of the communication device 112. In at least one embodiment, the DVR 106A may obtain the communication identifier from the user 114 during a device configuration process. In the instance of an IP television receiver, the network interface 208 may be integrated with the television tuner 202.

In some embodiments, the network interface 208 is operable to transmit messages to an external server that converts the message to a format compatible with the communication device 112. For example, the network interface 208 may be operable to connect to a web server that translates a request from the network interface 208 into an SMS message for transmission to the communication device 112. In at least one embodiment, the external server may be operable to translate information provided by the network interface 208 into a communication identifier of the communication device 112. For example, the network interface 208 may transmit a serial number or other identifier of the DVR 106A to the external server, and the external server may identify the communication identifier of the communication device 112 based on the serial number of the DVR 106A. In some embodiments, the network interface 208 may receive speech data and may transmit the same to an external server for speech recognition processing. The network interface 208 may then receive the recognized speech data and provide the same to the processor 204 for further processing.

As described above, the processor 204 identifies a recording conflict and several options for resolving the recording conflict. The network interface 208 transmits a first message 214 to the communication device 112 that includes information regarding the recording conflict. The communication device 112 receives the first message 214 and outputs information regarding the recording conflict to the user 114. The user 114 provides input requesting to resolve the recording conflict and the communication device 112 transmits the input to the network interface 208 in a second message 216. The processor 204 processes the information in the second message 216 and responsively modifies one or more recording timers associated with the recording conflict.

SMS messages are typically limited to 160 characters. Thus, a single SMS message may be inadequate for notifying the user 114 regarding a recording conflict. In at least one embodiment, the first message 214 may include one or more conflict identification codes identifying the recording conflict, and the communication device 112 may be operable to parse the conflict identification codes to determine information for display to the user 114. For example, the conflict identification code may identify the time/date of a recording timer, a program associated with a recording timer, options for resolving the recording conflict and the like. The communication device 112 may utilize information stored locally or remotely to identify the information to display to the user 114. For example, the communication device 112 may store a look-up table for identifying the information associated with particular conflict identification codes. In at least one embodiment, the communication device 112 may query an external server to identify information to be displayed for particular conflict identification codes.

In the previously described embodiments, the network interface 208 exchanges data with the communication device 112 over a data network. In at least one embodiment, the DVR 106A is operable to exchange information with the communication device 112 over a phone call transmitted over the communication network 110. For example, the network interface 208 may be operable to communicatively couple to either wired or wireless telephone networks, to initiate a phone call to the communication device 112. The phone call initiated responsive to the processor 204 identifying a recording conflict.

In at least one embodiment, the network interface 208 includes a voice synthesizer for converting a textual explanation of the recording conflict into an audible representation. The network interface 208 transmits the audible representation to the communication device 112 during the phone call, and the communication device 112 provides the audible representation to the user 114. The user 114 responsively provides input that is transmitted back to the DVR 106A for further processing.

In at least one embodiment, the user 114 is presented with several options corresponding with numerical identifiers. To select one of the options, the user 114 utilizes one of the keys of the communication device 112 to input an option for resolving the recording conflict. The communication device 112 transmits a DTMF signal to the network interface 208, and the network interface 208 is operable to identify the option selected by the user 114 based on the DTMF signal. The processor 204 then modifies one or more recording timers based the DTMF signal.

In some embodiments, the DVR 106A may use combinations of the aforementioned embodiments to exchange information regarding a recording conflict with the communication device 112. For example, the network interface 208 may include a voice synthesizer for explaining the recording conflict and the options to the user 114. The network interface 208 initiates a phone call to the communication device 112 and provides the voice explanation to the user 114 during the phone call. The user 114 may then initiate transmission of a message to the DVR 106A via the communication device 112 separately from the phone call. For example, the user 112 may initiate transmission of an e-mail or SMS message to the DVR 106A with the input requesting to resolve the recording conflict.

Those of ordinary skill in the art will appreciate that the various functional elements 202 through 208 shown as operable within the DVR 106A may be combined into fewer discrete elements or may be broken up into a larger number of discrete functional elements as a matter of design choice. Thus, the particular functional decomposition suggested by FIG. 2 is intended merely as exemplary of one possible functional decomposition of elements within the DVR 106A.

Figure 3:
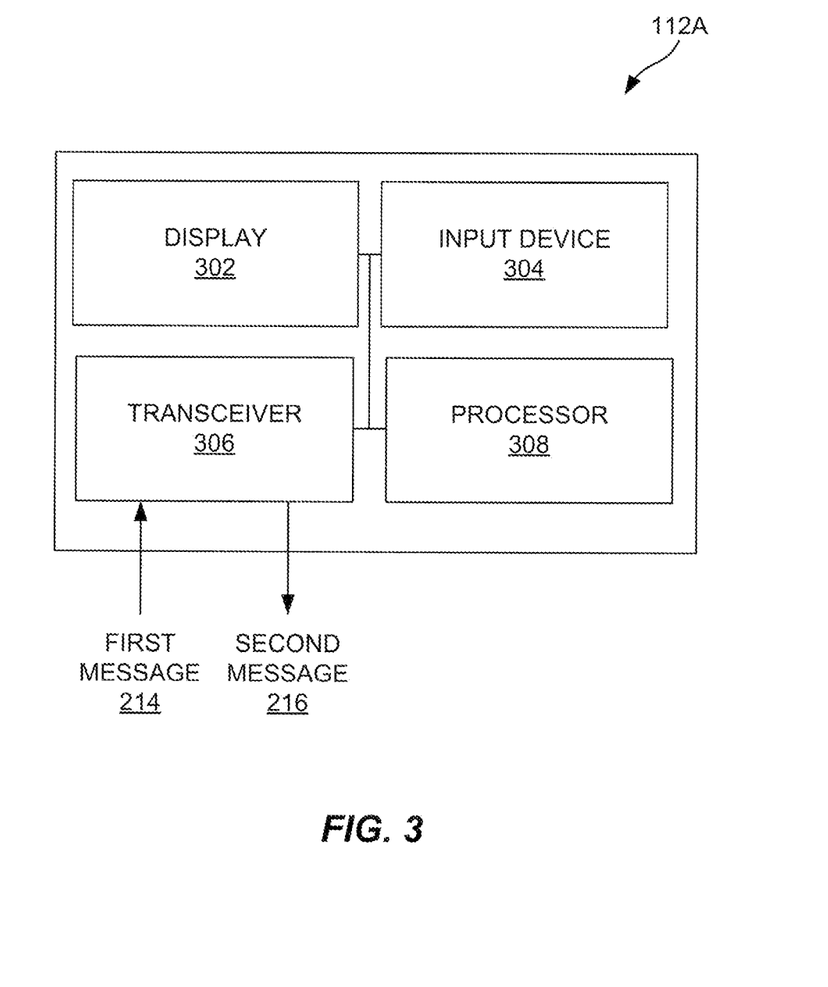
FIG. 3 illustrates the communication device of FIG. 1 embodied as a mobile telephone.

FIG. 3 illustrates the mobile telephone of FIG. 1 embodied as a mobile telephone 112A. FIG. 3 will be discussed in reference to the communication network 100 illustrated in FIG. 1. The mobile telephone 112A includes a display 302, an input device 304, a transceiver 306 and a processor 308. Each of these components is discussed in greater detail below. The mobile telephone 112A may include other components, devices or elements not illustrated for the sake of brevity.

The display 302 is operable for presenting information to the user 114. The display 302 may comprise any type of screen, such as a liquid crystal display (LCD) screen or the like. The input device 304 is operable for receiving input from the user 114. In at least one embodiment, the input device 304 is telephone keypad. The user 114 may utilize the keypad to input information for transmission to the DVR 106. The transceiver 308 is operable to wirelessly exchange data with the DVR 106 via the communication network 110. More particularly, the transceiver 308 is operable for sending and receiving the first message 214 and the second message 216. In at least one embodiment, the first message 214 may be transmitted in a plurality of communications, such as a plurality of SMS messages.

The processor 308 is operable for parsing the first message to identify a plurality of options to present to the user for resolving a recording conflict. The processor 308 outputs the options for presentation by the display 302. The processor 306 receives input from the input device 304 selecting one of the options for resolving the recording conflict and generates the second message 216 for transmission to the DVR 106.

As described above, the first message 214 may include a conflict identification code that is utilized by the processor 306 to identify information to display to the user 114. For example, the conflict identification code may identify a particular date, time or channel of the recording conflict, and the processor 306 may utilize a look-up table to determine the corresponding information to be displayed for the conflict identification code. In at least one embodiment, the processor 306 may query an external server to identify information to be displayed for a provided conflict identification code. Thus, by utilizing identification codes, the DVR 106 and the mobile telephone 112A may exchange more information using less SMS messages.

Those of ordinary skill in the art will appreciate that the various functional elements 302 through 308 shown as operable within the mobile telephone 112A may be combined into fewer discrete elements or may be broken up into a larger number of discrete functional elements as a matter of design choice. Thus, the particular functional decomposition suggested by FIG. 3 is intended merely as exemplary of one possible functional decomposition of elements within the mobile telephone 112A.

Figure 4:
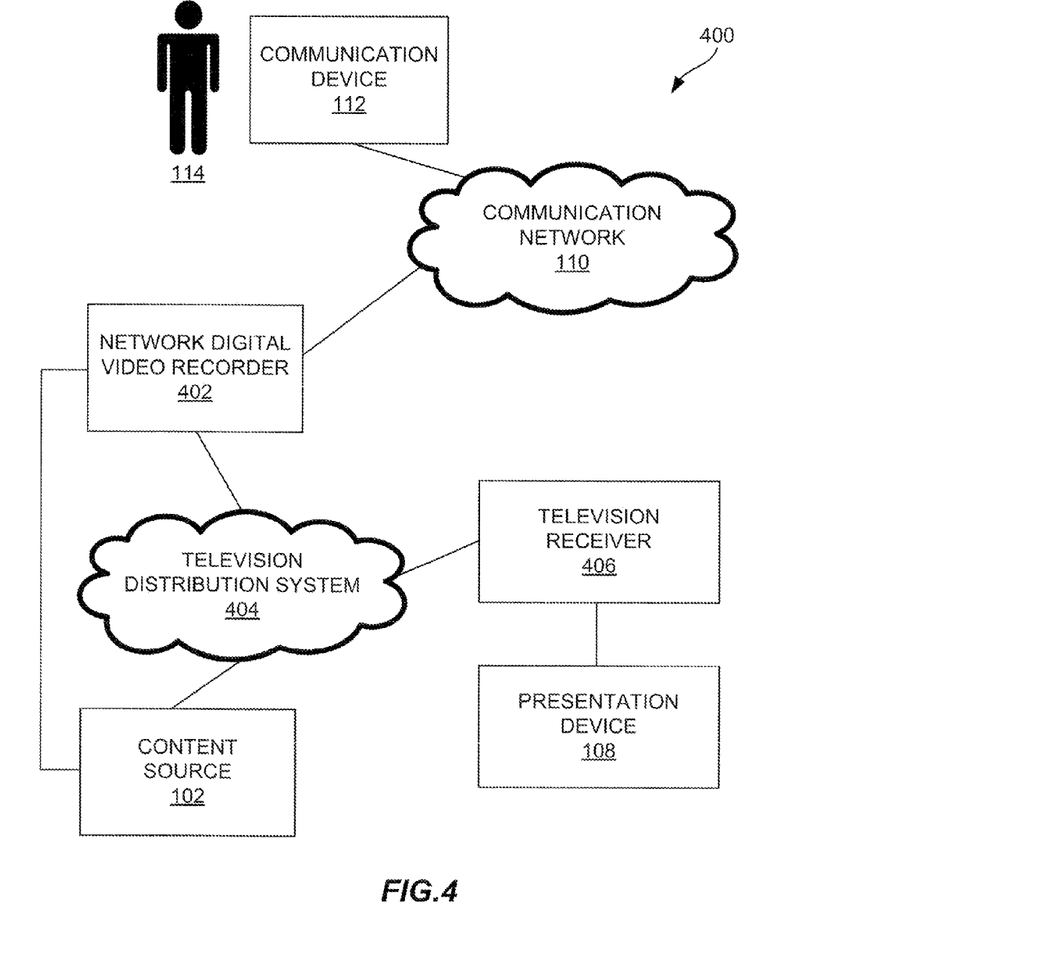
FIG. 4 illustrates another embodiment of a communication network.

FIG. 4 illustrates another embodiment of a communication network 400. More particularly, the communication network 400 includes network DVR functionality. The communication network 400 includes a presentation device 108, a communication network 110, a communication device 112, a network DVR 402, a television distribution system 404 and a television receiver 406. Each of these components will be discussed in greater detail below. FIG. 4 includes components common to FIG. 1, and the description of these components is omitted herein for the sake of brevity. The communication network 400 may also include other components, elements or devices not illustrated for the sake of brevity.

The network DVR 402 is operable to receive and record content from the content source 102. The network DVR 402 may be located at the head-end or other facility of a service provider, and is operable to record content for a plurality of users. In at least one embodiment, each user may be provided with dedicated space for recording content on the network DVR 402. In some embodiments, the storage space and particular recordings may be shared among a plurality of users. The television distribution system 404 may be similar to the television distribution system 104. The television distribution system 404 may be further configured to transmit on-demand viewing to allow users to access content on the network DVR 402.

The television receiver 406 is operable to receive content from the content source 102 via the television distribution system 404. The television receiver 406 may be embodied as a set-top box, such as cable television receiver, satellite receiver, IPTV receiver or the like. In at least one embodiment, the television receiver 406 may be integrated with the presentation device 108. The television receiver 406 is operable to communicate with the network DVR 402 to set recording timers and access content stored on the network DVR 402. The recorded content is transmitted to the television receiver 406 responsive to a request for output by the presentation device 108.

When recording conflicts occur, the network DVR 402 is operable to transmit messages to the communication device 112 regarding the recording conflict. The communication between the network DVR 402 and the communication device 112 may comprise SMS messages, e-mail messages, phone calls and the like as described above.

In at least one embodiment, the network DVR 402 is associated with a telephone number that the user 114 may call using the communication device 112 to provide input the network DVR 402 regarding resolution of a recording conflict. For example, the network DVR 402 may be associated with a call processing system for receiving phone calls from the user 114. The network DVR 402 may initiate transmission of a message to the communication device 112 (e.g., an SMS or e-mail message), or may leave a voice mail for a telephone number associated with the communication device 112. The user 114 may responsively call the call processing system and provide input via menus provided by the call processing system requesting to resolve the recording conflict. The network DVR 402 utilizes the input to modify recording timers in accordance with the user's instructions.

Figure 5:
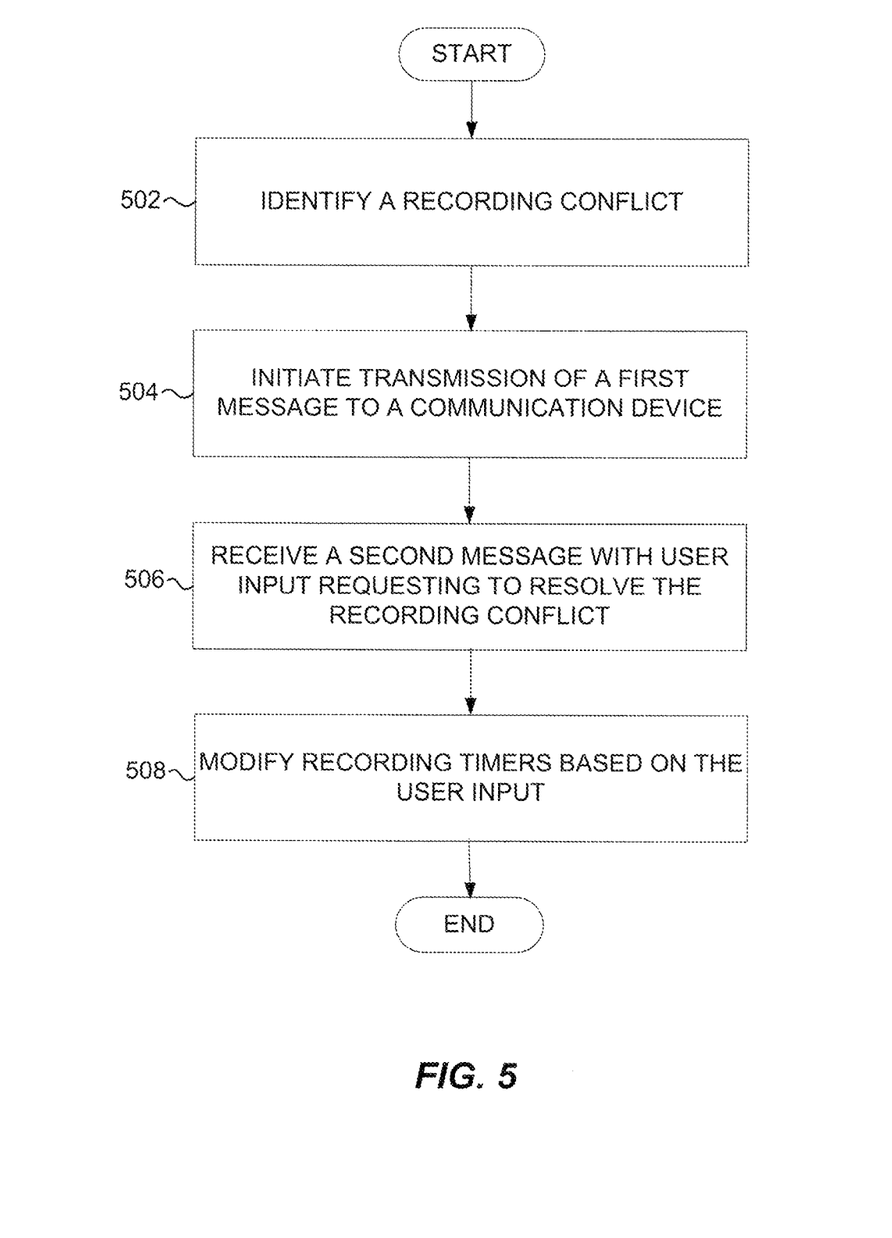
FIG. 5 illustrates an embodiment of a process for resolving a recording conflict.

FIG. 5 illustrates an embodiment of a process for resolving a recording conflict. More particularly, FIG. 5 illustrates a process for notifying a user of a recording conflict via a message transmitted to a communication device of the user. The process of FIG. 5 may include other operations not illustrated for the sake of brevity.

The process includes identifying a recording conflict of a DVR between a first recording timer associated with a first television program and a second recording timer associated with a second television program (operation 502). The process may optionally include identifying a plurality of options for resolving the recording conflict.

The process further includes initiating transmission of a first message to a communication device associated with a user of the DVR (operation 504). The first message includes information regarding the recording conflict. In at least one embodiment, the first message includes information regarding the options for resolving the recording conflict. In some embodiments, the first message may include a plurality of messages, such as a plurality of SMS messages.

The process further includes receiving a second message from the communication device responsive to the first message (operation 506). The second message includes user input requesting to resolve the recording conflict. In at least one embodiment, the second message is addressed to an e-mail address associated with the DVR. The process further includes modifying a first recording timer based on the user input responsive to the second message (operation 508). In at least one embodiment, operation 508 may additionally include modifying other recording timers, e.g., the second recording timer, based on the input provided by the user.

Figure 6:
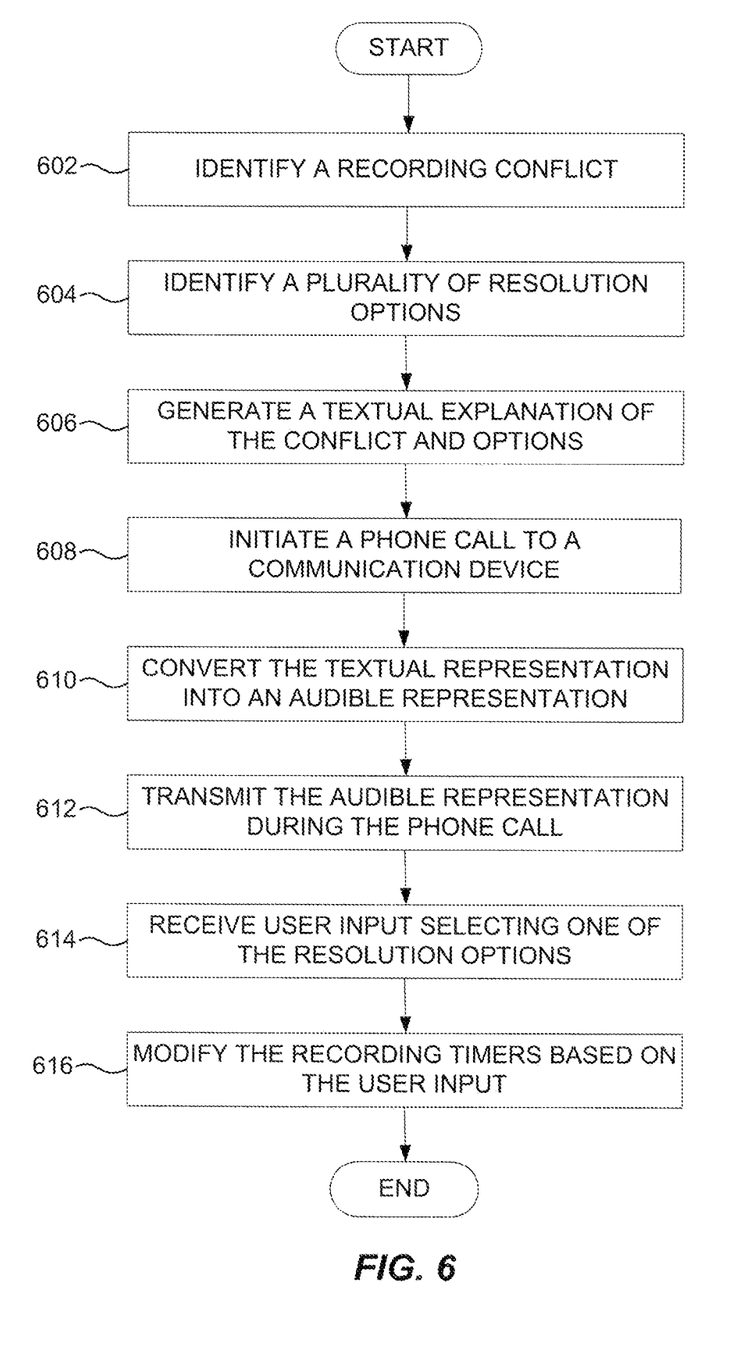
FIG. 6 illustrates another embodiment of a process for resolving a recording conflict.

FIG. 6 illustrates another embodiment of a process for resolving a recording conflict. More particularly, FIG. 6 illustrates a process for notifying a user of a recording conflict via a phone call to the user's communication device. The process of FIG. 6 may include other operations not illustrated for the sake of brevity.

The process includes identifying a recording conflict of a DVR between a first recording timer associated with a first television program and a second recording timer associated with a second television program (operation 602). The process further includes identifying a plurality of options for resolving the recording conflict (operation 604).

The process further includes generating a textual explanation regarding the recording conflict and the options for resolving the recording conflict (operation 606). For example, operation 606 may comprise arranging the information identifying the recording conflict and the options for resolving the recording conflict into sentences.

The process further includes initiating a phone call to a communication device associated with a user of the DVR (operation 608). The process further includes converting the textual explanation into an audible representation (operation 610). In at least one embodiment, the conversion process is performed by a text-to-speech synthesizer of the DVR. The process further includes transmitting the audible representation to the communication device during the phone call (operation 610).

The process further includes receiving user input from the communication device selecting one of the options for resolving the recording conflict (operation 612). In at least one embodiment, operation 612 includes receiving a DTMF signal from the communication device and processing the DTMF signal to determine the option selected by the user. In some embodiments, the DVR may include voice recognition functionality, and the user may speak an option which is recognized by the voice recognition module of the DVR. The process further includes modifying a first recording timer at the DVR based on the user input (operation 612).

Although specific embodiments were described herein, the scope of the invention is not limited to those specific embodiments. The scope of the invention is defined by the following claims and any equivalents therein.

What is claimed is:

1. A communication device comprising:
   a wireless transceiver configured to communicate with a mobile communication network, the wireless transceiver configured to receive a first message including a conflict identification code identifying a recording conflict between a first recording timer associated with a first television program and a second recording timer associated with a second television program;
   a processor communicatively coupled to the wireless transceiver and configured to process the conflict identification code to determine a plurality of options to present to a user for automatically resolving the recording conflict; and
   an input device communicatively coupled to the processor configured to receive user input selecting one of the options for automatically resolving the recording conflict,
   wherein the processor is further configured to generate a second message based on the user input and initiate transmission of the second message via the wireless transceiver.

2. The communication device of claim 1, further comprising a display communicatively coupled to the processor, wherein the processor is further configured to display the plurality of options on the display.

3. The communication device of claim 1, further comprising a speaker communicatively coupled to the processor, wherein the processor is further configured to present the plurality of options to the user via the speaker.

4. The communication device of claim 1, wherein the communication device is a tablet.

5. The communication device of claim 1, wherein the processor is further configured to transmit a third message to a server, via the wireless transceiver, requesting decoding of the conflict identification code.

6. The communication device of claim 1, comprising a memory communicatively coupled to the processor and configured to store a look-up table, wherein the processor is further configured to look-up the conflict identification code in the look-up table to identify the plurality of options to present to the user for resolving the recording conflict.

7. The communication device of claim 4, wherein the plurality of options include an option to record the first television program, an option to record the second television program, and an option to record one of the first television program and the second television program with an option to record the other of the first television program and the second television program at a different time.

8. The communication device of claim 1, wherein the first message includes textual data corresponding to the plurality of options for resolving the recording conflict, and the processor is further configured to convert the textual data into an audible representation of the textual data.

9. The communication device of claim 1, wherein the input device is a telephone keypad.

10. The communication device of claim 9, wherein the second message is configured to be a short-message-service message.

11. The communication device of claim 1, wherein the input device is a microphone and the processor is configured to generate the second message based upon input to the microphone.

12. The communication device of claim 11, wherein the second message is configured to be a dual-tone-multi-frequency signal.

13. A method for resolving a recording conflict, the method comprising:
   receiving, by a wireless transceiver of a communication device, a first message including a conflict identification code identifying the recording conflict between a first recording timer associated with a first television program and a second recording timer associated with a second television program;
   processing, by a processor communicatively coupled to the wireless transceiver, the conflict identification code to determine a plurality of options to present to a user for resolving the recording conflict;
   presenting, via a first interface, the plurality of options for automatically resolving the recording conflict;
   receiving, via a second interface, an indication of one of the plurality of options; and
   transmitting, via the wireless transceiver, the indication of one of the plurality of options.

14. The method of claim 13, wherein the communication device is a tablet.

15. A method for resolving a recording conflict, the method comprising:
   receiving, by a wireless transceiver of a communication device, a first message including a conflict identification code identifying the recording conflict between a first recording timer associated with a first television program and a second recording timer associated with a second television program;
   transmitting, by the wireless transceiver, the conflict identification code to a server;
   receiving, by the wireless transceiver, a plurality options to present to the user for resolving the recording conflict from the server; presenting, via a first interface, the plurality of options for resolving the recording conflict;
   receiving, via a second interface, an indication of one of the plurality of options; and
   transmitting, via the wireless transceiver, the indication of one of the plurality of options.

16. The method of claim 13, further comprising:
   determining, by the processor, the plurality of options to present to the user for resolving the recording conflict based upon the conflict identification code by comparing the conflict identification code to codes in a look-up table.

17. The method of claim 13, wherein the first interface is a speaker, and the second interface is a microphone, wherein the method further comprises:
- outputting, by the processor, the plurality of options via the speaker; and
- receiving, via the microphone, the indication of one of the plurality of options.

18. A communication device comprising:
- a wireless transceiver configured to communicate with a mobile communication network, the wireless transceiver configured to receive a first message including regarding conflict identification code identifying a recording conflict between a first recording timer associated with a first television program and a second recording timer associated with a second television program;
- a processor communicatively coupled to the wireless transceiver and configured to process the conflict identification code to identify a plurality of options to present to a user for automatically resolving the recording conflict;
- a speaker communicatively coupled to the processor, wherein the processor is configure to output an audible indication of the plurality of options via the speaker;
- an microphone communicatively coupled to the processor configured to receive an audible indication selecting one of the options for resolving the recording conflict, wherein the processor is further configured to generate a second message based on the audible indication selecting one of the options and initiate transmission of the second message via the wireless transceiver.

19. The communication device of claim 18, wherein the first and second messages comprise dual-tone-multi-frequency signals.

20. The communication device of claim 19, wherein first and second messages are short-message-service messages.

* * * * *